March 19, 1963  E. M. SPEYER  3,082,325
RADIATION MEASURING APPARATUS
Filed Dec. 16, 1960  2 Sheets-Sheet 1

INVENTOR
EDWARD M. SPEYER

BY
ATTORNEY

March 19, 1963  E. M. SPEYER  3,082,325
RADIATION MEASURING APPARATUS
Filed Dec. 16, 1960  2 Sheets-Sheet 2

INVENTOR
EDWARD M. SPEYER
BY
ATTORNEY

United States Patent Office 3,082,325
Patented Mar. 19, 1963

3,082,325
RADIATION MEASURING APPARATUS
Edward M. Speyer, Norwalk, Conn., assignor to American Machine & Foundry Company, a corporation of New Jersey
Filed Dec. 16, 1960, Ser. No. 76,268
17 Claims. (Cl. 250—83.3)

This invention relates to the art of measuring radiation, such as infrared radiation, for example, and more particularly to an improved radiation measuring method and apparatus of the type wherein the radiation is purposely interrupted cyclically, as by a chopper.

It has been common practice in the prior art to measure radiation by measuring its electrical effect on detectors such as thermocouples, bolometers, thermionic diodes, and the like, such detectors providing a direct current signal which, in the methods and apparatus to which the present invention applies, is modulated as by interrupting the radiation with a chopper, to provide an alternating current signal relatively independent of such extraneous variables as D.C. circuit drift, ambient temperature, power supply voltage, etc. The response time of presently known thermal radiation detectors having reasonable sensitivity is relatively slow. Hence, in methods and systems of the type referred to, the chopper or its equivalent must have a relatively low speed and the modulated output signal accordingly is of relatively low frequency.

It is obviously desirable to increase the signal frequency, as by increasing the speed at which the chopper is driven, in order to simplify amplification problems and to decrease the effect of extraneous variables, such as D.C. circuit drift. To increase chopper speed, however, it would normally be necessary to increase the rate of response of the detector, and this results in loss of sensitivity. Thus, with the methods and devices of the prior art, it has not been possible to achieve both high frequency of the output signal and good sensitivity of the thermal radiation detector.

A general object of the present invention is to provide a radiation measuring method and apparatus characterized by both high sensitivity and a relatively high operating frequency.

Broadly, the desired increase in sensitivity and operating frequency is accomplished in accordance with the invention by cooling the radiation detector during those time periods when the radiation beam is interrupted.

The usual radiation detectors operate on the principle that an increase in radiation impinging upon the detector increases the heat generated in the detector and therefore presents a corresponding increase in electrical indication at the output of the detector. When a chopping device is interposed between the radiation source and the detector, operation of the chopping device periodically interrupts the radiation beam and therefore periodically cuts off the source of detector heat. During the time period when the radiation beam is cut off, the detector loses heat by radiation, conduction, and frequently by convection, so that a decrease in the electrical output indication results. By cooling the detector during those periods when the radiation beam is interrupted, the present invention obtains a larger variation in the electrical output of the detector and so allows the chopping device to be speeded up without excessive loss of sensitivity.

Another object of the invention is to devise a radiation measuring method and apparatus wherein both high sensitivity and relatively high operating frequency are achieved by selective cooling of the radiation detector employed.

A further object is to provide an improved and more effective radiation measuring apparatus having a chopper, or like driven radiation-interrupting element, the chopper or the like being cooled to accomplish cooling of the radiation detector.

Yet another object is to devise electrical means for directly cooling the chopper of a radiation measuring apparatus of the type just described.

A still further object is to provide such a radiation measuring apparatus including means for intermittently and directly cooling the radiation detector.

In order that the manner in which these and other objects are attained, in accordance with the invention, can be understood in detail, reference is had to the accompanying drawings, which form a part of this specification, and wherein.

Figure 1:
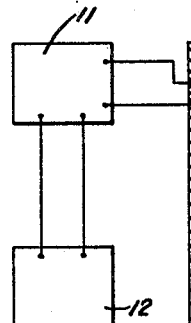
FIG. 1 is a semi-diagrammatic illustration of a radiation measuring device constructed in accordance with one apparatus embodiment of the invention.

Before describing in detail a manner in which the method of the present invention is carried out, and the several advantageous apparatus embodiments disclosed for practicing the method, it will be helpful to provide an analogy illustrating the general manner in which the desired results of the invention are achieved. Assume that, instead of measuring radiation, the problem were to measure the rate at which water flows from a faucet, one suitable measuring system would comprise a tall, small-diameter, cylindrical vessel provided with a slit running from top to bottom, and a water deflector disposed adjacent the faucet, the vessel being located beneath the faucet and the deflector being operated cyclically in order to periodically interrupt the flow of water into the vessel. Assume that the rate of water flow is such that, for any period when the deflector allows water to flow into the vessel, the water enters the vessel at a rate which is greater than the rate at which it flows from the vessel via the slit, so that the level of the water in the vessel will rise to a point dependent upon the rate of flow from the faucet. During any period when the deflector interrupts the flow of water to the vessel, the water level will fall by an amount proportional to the rate of flow into the vessel. This decrease in water level is proportional to the rate of flow because the slit permits increased outflow of water as the water level increases. Then, since the water level is proportional to the rate of flow into the vessel, the quantity of the water escaping via the slit is likewise proportional to the rate of inflow. Accordingly, the distance between the highest water level and the lowest water level is proportional to the rate of flow from the faucet.

The sensitivity of such a water-flow measuring device could be increased by varying the capacity of the vessel, the frequency of operation of the deflector or the width of the slit. For the purpose of this analogy, assume that it is not possible to select a combination of these factors which will provide both the desired sensitivity and desired speed of response. A method for further increasing the sensitivity would be to provide a variable outflow rate, as by providing a wide slit (high outflow rate) when water is not flowing into the vessel and a narrow slit (low outflow rate) when water is flowing into the vessel. Since this variable outflow rate would greatly increase the distance between the high water level point and the low water level point, yet would leave this distance proportional to the rate of water flow from the faucet, a larger output indication from the device would be provided and the sensitivity would thus be increased.

Turning now to the conventional types of radiation measuring apparatus, it will be seen that the analogy just described is applicable. As radiation impinges on the detector, the detector heat increases and a proportional increase in electrical output results. When the radiation is interrupted, heat is radiated from the detector to the surrounding area, increasing the outflow of water from the vessel via the slit in the foregoing analogy, and the electrical output of the detector decreases. In effect, the present method is based upon the concept of providing a relatively low detector heat loss during the time when radiation falls upon the detector and a relatively high detector heat loss during the time when the radiation beam is interrupted. Application of this concept increases the difference between the maximum and minimum electrical indications, a result essentially the same as increasing the distance between the high and low water levels in the analogy, and so increases the sensitivity of the apparatus and allows the use of a higher operating frequency.

Figure 2:
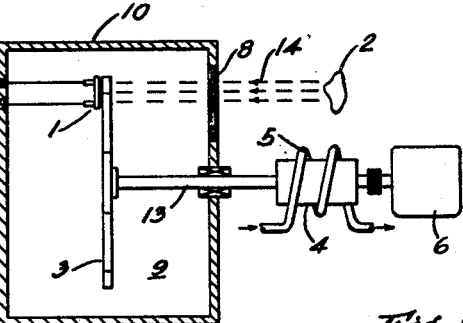
FIG. 2 is a front view of a chopper employed in the device of FIG. 1.

One relatively simple apparatus for practicing the present method is illustrated in FIG. 1. Radiation, which may be infrared, emanates from a radiation source 2, forming a radiation beam 14 which passes through a window 8, impinging upon a radiation detector 1. The radiation detector may be a thermocouple, bolometer, thermionic diode or other suitable radiation measuring device. The radiation detector 1 is disposed within a vacuum chamber 9 surrounded by chamber walls 10. The window 8 is of the type which permits passage of the particular radiation being measured. Disposed within the vacuum chamber 9 is a rotary chopper disc 3 so arranged that its plane of rotation is in close proximity to detector 1. This disc may have any of numerous configurations, that shown in FIG. 2 being typical. Thus, disc 3 includes two blocking areas 16 spaced angularly by open or non-blocking areas 15. The chopper disc 3 is supported by a shaft 13 and is caused to rotate at a substantially constant speed by the motor 6.

Disposed on the shaft is a cylindrical heat conducting mass 4 constituting a heat sink. A refrigerating coil 5, of conventional construction and through which a suitable coolant is passed, surrounds mass 4. As the coolant passes through the refrigerating coil 5, it removes heat from the sink which in turn draws heat from the shaft 13 and the chopper disc 3. This arrangement maintains the chopper disc 3 at a relatively low temperature.

A suitable amplifier 11 is connected to the output leads of the radiation detector to amplify the electrical indications obtained from the detector. A recording or indicating instrument, such as the recorder 12, is connected to the output of the amplifier 11.

As chopper disc 3 rotates, the blocking areas 16 sequentially interrupt the radiation beam 14. Thus, as a blocking area 16 passes through the radiation beam 14, the beam is cut off and no radiation falls upon the radiation detector 1. Subsequently, as the corresponding open area 15 permits the beam to pass, radiation falls upon detector 1, thus giving an increase in the electrical indication to the amplifier 11. Shortly after the open area 15 passes, the second blocking area 16 interrupts the beam and the electrical indication passing to the amplifier 11 accordingly decreases, since the radiation detector 1 now loses heat.

Since mass 4 is refrigerated by coil 5 and is directly connected to chopper 3, in good heat conducting relation, via metal drive shaft 13, the mass acts as a highly efficient heat sink to conduct heat quickly from disc 3. Since the chopper disc 3 is so located and dimensioned that blocking areas 16 thereof pass in close proximity to detector 1, the heat sink is effective to draw a substantial amount of heat from the detector each time one of the blocking areas, in interrupting the radiation beam, passes the detector. Accordingly, the apparatus embodiment of FIG. 1 is suitable for carrying out the present method, cooling the detector upon each interruption of the radiation beam.

Figure 3:
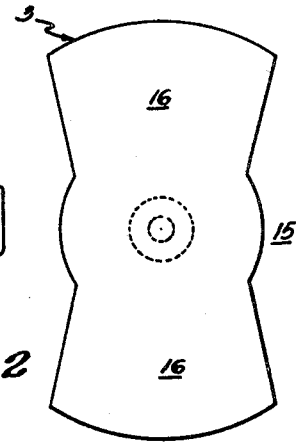
FIGS. 3 and 4 are semi-diagrammatic illustrations of additional measuring devices constructed in accordance with the invention for carrying out the present method.
Figure 3:
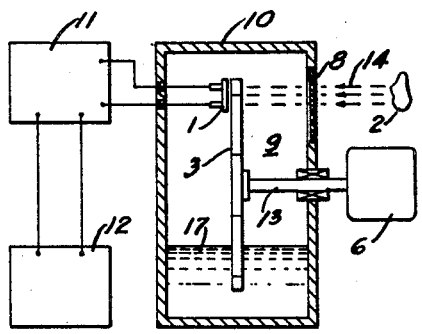

Another arrangement by which the chopper disc 3 can be cooled in order to practice the method of this invention is shown in FIG. 3. Here, chopper disc 3 is disposed within the vacuum chamber 9 and is arranged to intermittently interrupt the radiation beam 14, precisely as described with reference to FIG. 1. The bottom of the vacuum chamber contains a coolant of low vapor pressure, such as silicone oil 17. Since the chopper disc 3 comes in contact with the coolant 17, the disc is cooled to a relatively low temperature. Other than the manner in which the chopper disc is cooled, operation of the embodiment of FIG. 3 is the same as for the embodiment shown in FIG. 1.

Figure 4:
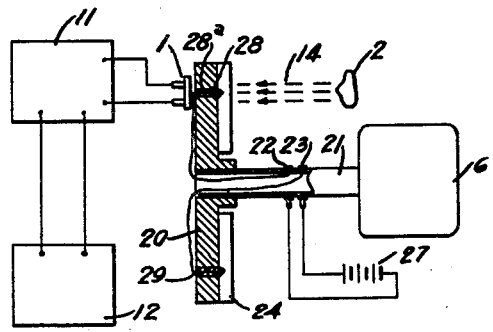
Figure 5:
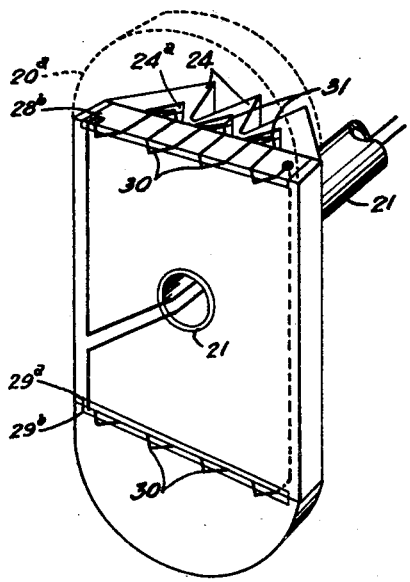
FIG. 5 is an enlarged perspective view of a chopper employed in the apparatus of FIG. 4, with a portion thereof broken away for clarity of illustration.

FIGS. 4 and 5 illustrate another manner in which the chopper disc can be cooled, in this instance by electrical means including thermocouples. If direct current is made to flow through a thermocouple by an external potential, a heat pump effect is achieved, heat being transferred from the cold junction to the hot junction of the thermocouple. This is usually known as Peltier cooling. If the chopper disc is provided with a number of thermocouples so arranged that the cold junctions are on the side adjacent to the radiation detector, heat can be transferred from the side of the chopper adjacent the radiation detector to the other side. This, in effect, cools one side of the chopper disc and causes heat to be taken from the radiation detector whenever a portion of the chopper disc passes close by the detector.

FIG. 5 illustrates a chopper disc containing a plurality of thermocouples employed for cooling one side of the disc and radiating heat from the other. The disc can be of any suitable configuration, so long as it provides blocking portions 16, and is supported by a suitable hollow shaft 21 through which the thermocouple leads pass. A plurality of thermocouples 28, 29 are disposed in the chopper disc with their cold junctions 30 at the side which passes adjacent to the radiation detector and their hot junctions 31 at the opposite side. Suitable cooling fins 24 are secured to and project from the side of the chopper disc opposite the detector, the fins aiding dissipation of heat from the hot junctions 31.

In this embodiment, chopper 20 includes a main body portion 20a and separate end portions 20b, the latter being secured to the main body portion by screws (not shown) or in any other suitable fashion. Each set of thermocouples 28, 29, is sandwiched between a pair of sheets of electrical insulating material, indicated at 28a and 28b and 29a and 29b, the electrical insulating sheets being clamped between body portion 20a of the chopper and the corresponding one of portions 20b. Thus, electrical isolation of the thermocouples from the portions 20a and 20b is accomplished. Fins 24 are part of an integral, cast body of metal having good heat conducting properties, this body being secured to the adjacent face of chopper 20 by screws or in any other suitable fashion. The fins are provided with recesses 24a which each accommodate one of the hot junctions 31 of the thermocouples, so that the hot junctions are out of electrical contact with the metallic fins but are in good heat transfer relation with respect thereto.

The chopper disc shown in FIG. 5 can be employed in the radiation measuring instrument shown in FIG. 4. Here, radiation emanates from source 2 as radiation beam 14 and impinges upon the radiation detector 1. Chopper disc 20, supported by hollow shaft 21 and rotated by a motor 6, periodically interrupts the radiation beam 14. The thermocouples 28 and 29 are imbedded in the chopper disc 20 and cool the side of the disc adjacent to the radiation detector 1. A battery 27 causes current to flow through the slip rings 22 and 23, disposed on the shaft 21, and thus through the thermocouples 28 and 29. The current flow through thermocouples 28 and 29 is in a direction which causes heat to flow from the side of the chopper disc 20 adjacent the radiation detector to the other side which contains the cooling fins 24. Accordingly, the radiation detector 1 is cooled whenever the thermocouples disposed in the blocking portions 33 pass close to the radiation detector. The alternating signal output of the radiation detector 1 is amplified by the amplifier 11 and an indication is rendered by the recorder 12.

Figure 6:
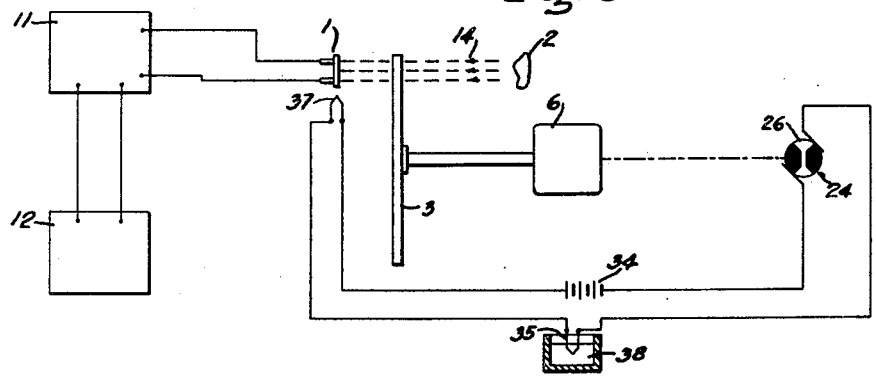
FIGS. 6-8 are diagrammatic illustrations of further apparatus embodiments constructed to carry out the method of the present invention.

Another arrangement for intermittently cooling the radiation detector is shown in FIG. 6. As in the embodiments earlier described, radiation emanating from source 2 forms beam 14 which impinges upon a radiation detector 1, the output from the radiation detector being amplified in amplifier 11 and indicated on recorder 12. A chopper disc 3, which may be of the type shown in FIG. 2 and rotated by motor 6, is employed to periodically interrupt the radiation beam 14. A thermocouple cold junction 37 is disposed in immediate proximity to the radiation detector 1. Connected in series with the cold junction 37 is the hot junction 35, which is immersed or embedded in a suitable coolant 38, a commutator 24 and a battery 34 completing the series circuit. The commutator 24 is driven by motor 6 and therefore rotates at the same speed as the chopper disc 33. The commutator 24 is rotationally oriented with respect to the chopper disc 3 in such manner that the conducting portion 26 of the commutator permits current to flow through the thermocouple during the time at which the chopper disc 3 interrupts the radiation beam 14. Accordingly, the cold junction 37 will cool the radiation detector during the time at which the chopper disc 3 interrupts the radiation beam 14. This particular embodiment is advantageous in situations where it is desired to locate the chopper at such a distance from the radiation detector that the chopper cannot be used to cool the detector.

Figure 7:
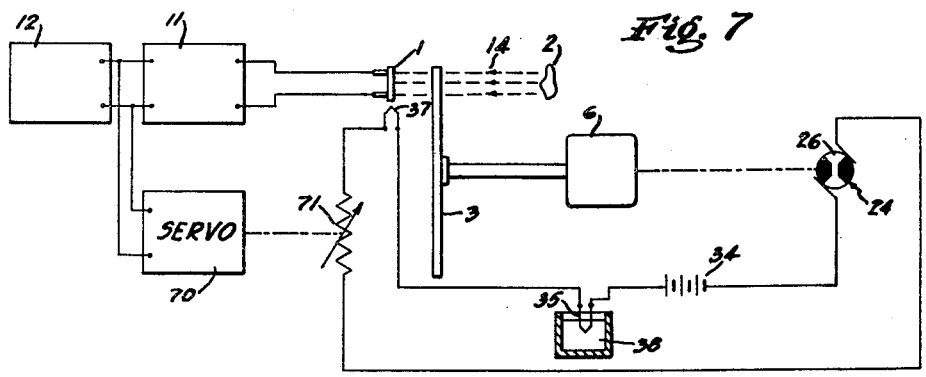

Operation of the circuit shown in FIGS. 4, 6 can be further improved by cooling the radiation detector to an extent which is proportional to the amplifier output. Thus, if a large amount of radiation falls on the detector, it is offset by a larger amount of cooling. Accordingly, the difference between the positive and negative peaks of the detector output is further increased, at a rate proportional to the amount of radiation falling on the detector. FIG. 7 illustrates one advantageous apparatus in accordance with this embodiment. Here, the apparatus employs all of the elements hereinbefore described with reference to FIG. 6, the servo unit 70 and variable resistor 71 are additionally employed, resistor 71 being connected in series between cold junction 37 and commutator 24, and the servo unit 70, of any suitable conventional construction, being arranged to adjust resistor 71 in accordance with the output of amplifier 11. As the output of the amplifier 11 increases, indicating an increase in radiation from the source 2, the servo unit decreases the resistance of the variable resistor 71, permitting increased current flow and thereby increased cooling by the cold junction 37. As the output of the amplifier 11 decreases, as a result of decrease in radiation emanating from source 2, the servo unit 70 increases the resistance of variable resistor 71 and thereby decreases the cooling effect of the thermocouple. In effect, this is a positive feedback arrangement whereby the output of the amplifier 11 is permitted to increase the variations at the input to the amplifier.

Figure 8:
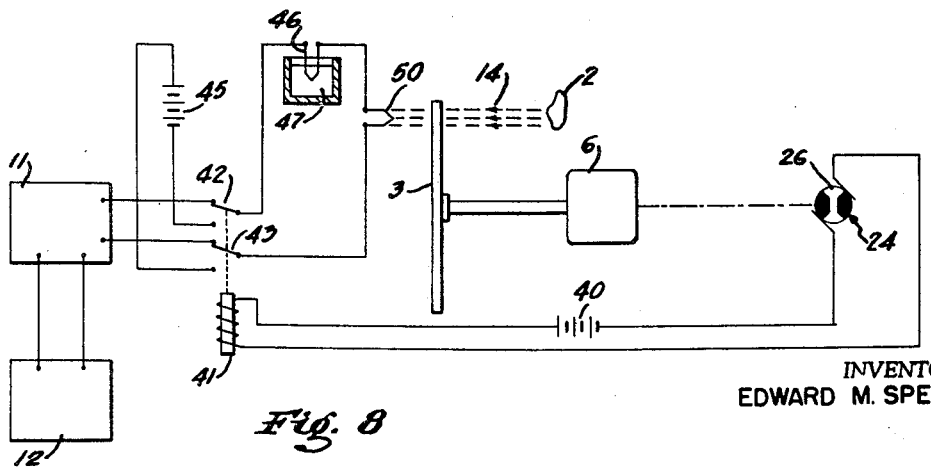

When the radiation detector employed is a thermocouple, it is possible to employ the radiation detector itself as the cooling unit. This can be done by connecting the thermocouple radiation detector to the amplifier during the time at which radiation falls on the detector and connecting the thermocouple to a battery to permit current flow through the detector to obtain a cooling effect during the time when radiation does not fall on the detector. A circuit for accomplishing this is shown in FIG. 8. Radiation emanates from the radiation source 2 forming the radiation beam 14 which impinges upon the thermocouple radiation detector hot junction 50. A chopper disc 3 is disposed to periodically interrupt beam 14 and is rotated by motor 6. Also connected to the motor 6 is the commutator 24 which is arranged to rotate synchronously with the chopper disc 3. The battery 40 causes current to periodically flow through the conducting portion 26 of the commutator 24, thus periodically energizing a relay 41. The commutator 24 is arranged so that the relay 41 is in the de-energized position, as shown, during those time periods when chopper 3 allows radiation to pass to the detector. The hot junction 50, along with its cold junction 46, which is immersed in an ice and water solution, develop a signal at the input of the amplifier 11 which rises to a maximum amplitude proportional to the amount of radiation impinging upon the detector. At times when the chopper disc 3 blocks the radiation beam 14, relay 41 is energized, so that contacts 42 and 43 connect the second battery 45 in series with the hot junction 50 and cold junction 46. Current flow is in a direction which produces a cooling effect such that heat is removed from the area of the hot junction 50 and deposited in the coolant solution 47.

Another arrangement whereby the amount of intermittent cooling of the radiation detector can be regulated according to the strength of the signal falling on said detector is to provide means for varying the width of the effective blocking areas 16 of the chopping disc 3. This can be accomplished in any one of several ways. One method is similar to that of variable pitch propellers on aircraft. Another is to provide two discs mounted close together on the same shaft 13 and to vary the angle of overlap between them as seen by the detector 1. For example, for minimum cooling the two discs would be entirely one behind the other so that the detector 1 would see only one of them, as in FIG. 2.

While several advantageous apparatus embodiments have been described for carrying out the present method, it will be understood by those skilled in the art that various changes and modifications can be made without departing from the scope of the invention as defined in the appended claims.

What is claimed is:

1. In an apparatus for measuring radiation, the combination of a radiation detector characterized by the generation of heat when subjected to the radiation to be measured, means for periodically subjecting said detector to the radiation to be measured, means for deriving an electrical signal from said detector which varies periodically with the interruption of the radiation and cooling means operatively associated with said detector to cool the same only when said detector is not subjected to the radiation being measured whereby the magnitude of the variations of said signal is increased.

2. In an apparatus for measuring radiation from a source, the combination of a radiation detector disposed to receive a portion of the radiation from the source, interrupting means disposed to periodically interrupt the flow of radiation from the source to said detector, means to derive electrical indications from said detector and periodic cooling means operative to cool said detector only during time periods when the flow of radiation from the source to said detector is interrupted so as to increase the difference between the maximum and minimum electrical indications.

3. An apparatus in accordance with claim 2 and wherein said interrupting means includes a member disposed to pass in immediate proximity to said detector during operation of said interrupting means, and said cooling means is effective to cool said member resulting in periodic cooling of said detector during operation of the apparatus.

4. An apparatus in accordance with claim 2 and wherein said cooling means is operative to directly cool said detector during said time periods.

5. In an apparatus for measuring radiation from a source, the combination of a radiation detector disposed to receive radiation from the source and characterized by the generation of heat when subjected to the radiation to be measured; radiation beam interrupting means comprising a member mounted for movement into and out of a position closely adjacent to said detector, in which position said member interrupts the flow of radiation from the source to said detector; and means for cooling said member and thereby cooling said detector when said member occupies said position.

6. An apparatus in accordance with claim 5 and wherein said means for cooling said member comprises a heat sink arranged to conduct heat from said member.

7. An apparatus in accordance with claim 6 and wherein said member is mounted on a rotary heat conductive drive shaft and said heat sink comprises a heat conductive mass carried by said shaft and means for cooling said mass.

8. An apparatus in accordance with claim 5 and wherein said means for cooling said member comprises means defining a chamber for containing a coolant fluid, and said member is disposed to pass through said chamber.

9. An apparatus in accordance with claim 5 and wherein said means for cooling said member comprises a plurality of thermocouples carried by said member and disposed to transfer heat away from that portion of said member which is nearest said detector when said member is in said position.

10. In a radiation beam interrupter for use in radiation measuring devices, the combination of an operating shaft, a radiation beam-interrupting member mounted on said shaft for movement thereby, said member having at least one beam-interrupting portion including a surface to be disposed away from the radiation source when in use, and at least one thermocouple carried by said beam-interrupting portion and having a cold junction disposed at said surface and a hot junction spaced from said surface.

11. In a radiation beam chopper for radiation measuring devices, the combination of a rotary operating shaft; a chopper member mounted on said shaft for rotation thereby, said member having at least one radiation beam-interrupting portion having a flat face transverse to the axis of said shaft and a plurality of heat-radiating fins projecting from said portion opposite said flat face; and a plurality of thermocouples each having its cold junction disposed at said flat face and its hot junction disposed in good heat transfer relation to at least one of said fins.

12. In an apparatus for measuring radiation from a source, the combination of a radiation detector disposed to receive radiation from the source and characterized by generation of heat when subjected to such radiation; interrupting means operative to periodically interrupt the flow of radiation from the source to said detector; cooling means disposed in good heat transfer relation with respect to said detector; and means connected to said cooling means and operative to control the same to cool said detector during those periods when said interrupting means interrupts the flow of radiation to said detector.

13. An apparatus in accordance with claim 12 and wherein said cooling means comprises at least one thermoelectric device, electrical circuit means for energizing the same, and means synchronized with said interrupting means for activating said circuit means when said interrupting means interrupts the flow of radiation to said detector.

14. In an apparatus for measuring radiation from a source, the combination of a radiation detector disposed to receive radiation from the source and characterized by generation of heat when subjected to such radiation; means operative to periodically interrupt the flow of radiation from the source to said detector; means for deriving from said detector a periodic electrical signal related to the radiation periodically received by said detector when the apparatus is in operation; controllable cooling means operative to cool said detector when the flow of radiation to said detector is interrupted; and means responsive to the magnitude of said signal for controlling said cooling means to provide an increased cooling effect when the magnitude of said signal increases.

15. An apparatus in accordance with claim 14 and wherein said cooling means comprises at least one thermoelectric device and electrical circuit means for energizing the same when the flow of radiation to said detector is interrupted, said circuit means including a variable element, and said means responsive to the magnitude of said signal being connected to said variable element to vary the same.

16. In an apparatus for measuring radiation from a source, a thermocouple radiation detector disposed to receive radiation from the source; means operative to expose said detector periodically to radiation from the source; a source of electrical potential; first circuit means adapted to derive from said detector an electrical signal representative of the radiation received by said detector; second circuit means arranged to connect said potential source to said detector to operate the thermocouple of said detector as a cooling device; and periodically operated control means arranged to connect said first circuit means to said detector when said detector receives radiation and to connect said second circuit means to said detector when said detector does not receive radiation.

17. An apparatus in accordance with claim 16 and wherein said means operative to expose said detector periodically to radiation includes a driven radiation beam-interrupting member and said periodically operated control means includes switching means operated in synchronism with said beam-interrupting member.

References Cited in the file of this patent

UNITED STATES PATENTS

| | | |
|---|---|---|
| 2,844,737 | Hahn et al. | July 22, 1958 |
| 2,886,970 | Munker | May 19, 1959 |